(12) United States Patent
Trivedi et al.

(10) Patent No.: US 10,510,239 B1
(45) Date of Patent: Dec. 17, 2019

(54) SYSTEMS AND METHODS FOR MANAGING ALERT NOTIFICATIONS FROM A SECURED AREA

(71) Applicant: Honeywell International Inc., Morristown, NJ (US)

(72) Inventors: Ishit Trivedi, Bangalore (IN); Jagadeesh Brahmajosyula, Bangalore (IN); Atul Laxman Katole, Bangalore (IN); Sunil Venugopalan, Bangalore (IN); Hemant Mahsky, Bengaluru (IN)

(73) Assignee: Honeywell International Inc., Morris Plains, NJ (US)

( * ) Notice: Subject to any disclaimer, the term of this patent is extended or adjusted under 35 U.S.C. 154(b) by 0 days.

(21) Appl. No.: 16/008,400

(22) Filed: Jun. 14, 2018

(51) Int. Cl.
```
G08B 25/00    (2006.01)
G08B 13/196   (2006.01)
G08B 21/18    (2006.01)
G06K 9/00     (2006.01)
G08B 21/02    (2006.01)
G07F 19/00    (2006.01)
```

(52) U.S. Cl.
CPC ....... *G08B 25/005* (2013.01); *G06K 9/00362* (2013.01); *G06K 9/00369* (2013.01); *G06K 9/00624* (2013.01); *G06K 9/00771* (2013.01); *G07F 19/20* (2013.01); *G07F 19/207* (2013.01); *G08B 13/196* (2013.01); *G08B 21/0297* (2013.01); *G08B 21/182* (2013.01); *G08B 25/001* (2013.01)

(58) Field of Classification Search
CPC .............. G07F 19/207; G06K 9/00362; G06K 9/00369; G06K 9/00624; G06K 9/00771; G08B 13/196; G08B 21/00; G08B 21/02; G08B 21/0297; G08B 21/18; G08B 21/182; G08B 21/22; G08B 25/001; G08B 25/005
See application file for complete search history.

(56) References Cited

U.S. PATENT DOCUMENTS

| | | |
|---|---|---|
| 4,737,847 A | 4/1988 | Araki et al. |
| 5,091,780 A | 2/1992 | Pomerleau |
| 5,237,408 A | 8/1993 | Blum et al. |
| 5,519,669 A | 5/1996 | Ross et al. |
| 7,619,647 B2 | 11/2009 | Wren et al. |
| 7,733,371 B1 | 6/2010 | Monroe |

(Continued)

OTHER PUBLICATIONS

Ray et al., Heritage Institute of Technology, An Intelligent Vision System for Monitoring Security and Surveillance of ATM, © 2015 IEEE.

(Continued)

*Primary Examiner* — Andrew W Bee
(74) *Attorney, Agent, or Firm* — Seager Tufte & Wickhem LLP

(57) ABSTRACT

Systems and methods for managing alert notifications from a secured area are provided. Such systems and methods can include a surveillance device monitoring the secured area and transmitting data captured from the secured area to an artificial intelligence module, the artificial intelligence module using the data to identify a scenario associated with the secured area and a notification priority of the scenario, and when the notification priority is at or above a preconfigured level, the artificial intelligence module transmitting an alert notification to a cloud server indicative of the scenario.

7 Claims, 4 Drawing Sheets

(56) References Cited

U.S. PATENT DOCUMENTS

| | | | |
|---|---|---|---|
| 7,868,912 B2 | 1/2011 | Venetianer et al. | |
| 8,531,286 B2 | 9/2013 | Friar et al. | |
| RE44,527 E | 10/2013 | Aviv | |
| 8,711,217 B2 | 4/2014 | Venetianer et al. | |
| 2002/0038818 A1* | 4/2002 | Zingher | G06K 9/00597 |
| | | | 235/381 |
| 2004/0223629 A1 | 11/2004 | Chang | |
| 2005/0275543 A1* | 12/2005 | Hisano | B60R 25/1004 |
| | | | 340/573.1 |
| 2006/0195716 A1* | 8/2006 | Bittner | G08B 13/19656 |
| | | | 714/6.11 |
| 2007/0257986 A1 | 11/2007 | Ivanov et al. | |
| 2008/0012760 A1* | 1/2008 | Derrick | G08B 21/0211 |
| | | | 342/357.74 |
| 2008/0251578 A1* | 10/2008 | Jansing | G07F 7/1075 |
| | | | 235/379 |
| 2012/0019353 A1* | 1/2012 | Knasel | G05B 23/0229 |
| | | | 340/4.35 |
| 2015/0096352 A1* | 4/2015 | Peterson | F24F 11/30 |
| | | | 73/31.02 |
| 2015/0317893 A1* | 11/2015 | Tseng | H04M 1/72522 |
| | | | 340/686.1 |
| 2017/0032646 A1* | 2/2017 | Alameh | G08B 21/0297 |
| 2017/0272705 A1* | 9/2017 | Wang | H04L 51/04 |
| 2017/0358195 A1* | 12/2017 | Bobda | H04N 7/188 |
| 2018/0033292 A1* | 2/2018 | Bhat | G08B 21/22 |
| 2018/0158585 A1* | 6/2018 | Bitetto | H01F 7/064 |
| 2018/0224314 A1* | 8/2018 | Yoshida | G01L 19/0046 |
| 2018/0350213 A1* | 12/2018 | Bart | H04N 7/186 |

OTHER PUBLICATIONS

P. Kamala et al., Veltech Multitech Dr. Rangarajan Dr. Sakunthala Engineering College, Automated Intelligent Surveillance Using Human Behavior Analysis in Shopping Malls, International Journal of Computer Science and Information Technologies, vol. 6 (5), 2015, pp. 4392-4396.

S. Shriram et al., New Horizon College of Engineering, Smart ATM Surveillance System, 2016 International Conference on Circuit, Power and Computing Technologies.

* cited by examiner

SYSTEMS AND METHODS FOR MANAGING ALERT NOTIFICATIONS FROM A SECURED AREA

FIELD

The present invention relates generally to systems and methods for managing alert notifications from a secured area. More particularly, the present invention relates to systems and methods that employ artificial intelligence modules in conjunction with a cloud server and a mobile device to streamline and manage the alert notifications from the secured area.

BACKGROUND

Known systems and methods for managing alert notifications from secured areas employ simple sensors or rely on manual monitoring. For example, known systems and methods that employ simple sensors typically send a large volume of alert notifications to a monitoring station, which can result in critical alert notifications being missed. Some systems and methods have been developed to reduce the large volume of alert notifications sent to the monitoring station by making sensor data time sensitive, but doing so can cause systems and methods to miss critical conditions in the secured areas. Similarly, known systems and methods that employ manual monitoring can also result in missed threats because operators typically view a large volume of secured areas simultaneously.

In view of the above, there is a continuing, ongoing need for improved systems and methods.

DETAILED DESCRIPTION

Figure 1:
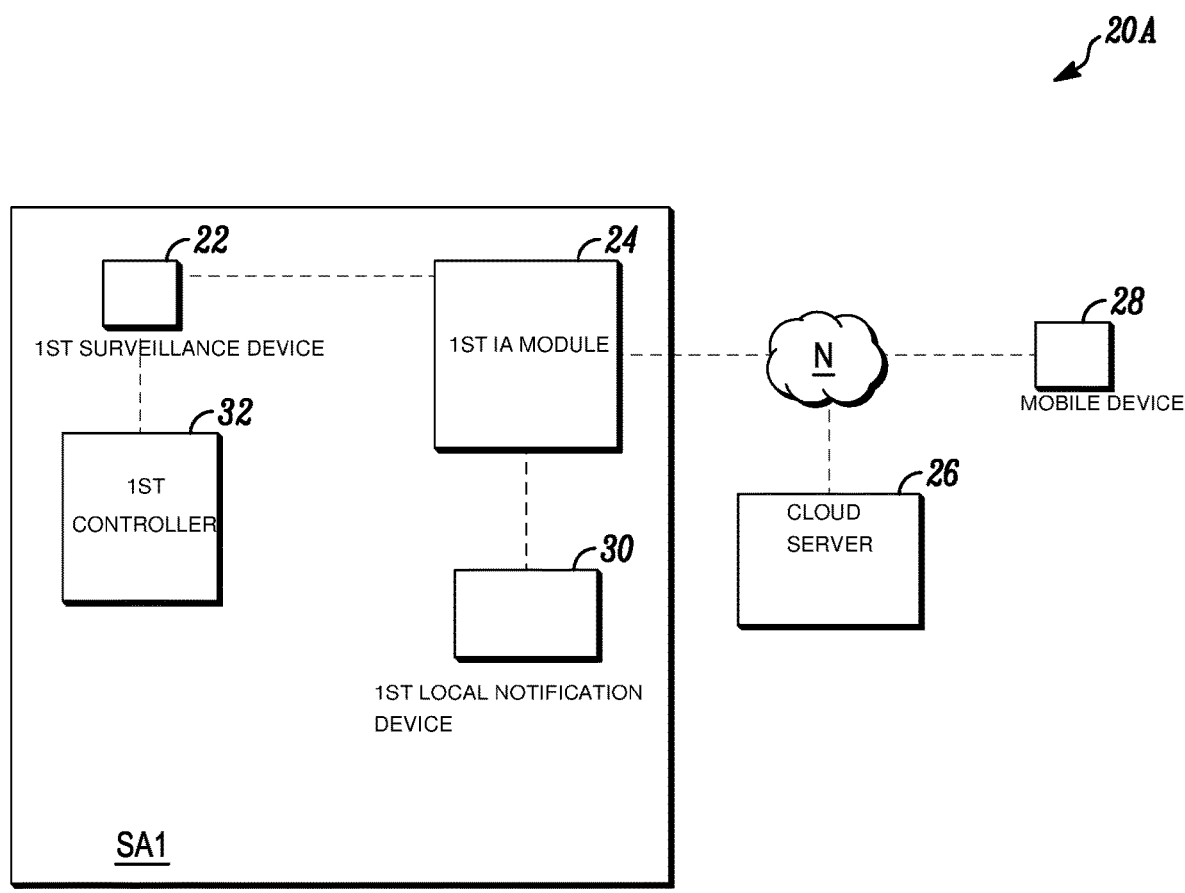
FIG. 1 is a block diagram of a system in accordance with disclosed embodiments.

While this invention is susceptible of an embodiment in many different forms, there are shown in the drawings and will be described herein in detail specific embodiments thereof with the understanding that the present disclosure is to be considered as an exemplification of the principles of the invention. It is not intended to limit the invention to the specific illustrated embodiments.

Embodiments disclosed herein can include systems and methods for managing alert notifications from a first secured area. Such systems and methods can include a first surveillance device, a first artificial intelligence module (a processor), a cloud server, and a mobile device communicating with one another using known local and remote wireless and wired mediums. In some embodiments, the first surveillance device can include one or more combinations of a video camera, an audio sensor, an infrared sensor, and the like, and first data captured and generated by the first surveillance device can include audio data and/or video data captured from the first secured area.

Systems and methods disclosed herein can include the first surveillance device monitoring the first secured area and transmitting the first data to the first artificial intelligence module and the first artificial intelligence module using the first data to identify a first scenario associated with the first secured area and a first notification priority of the first scenario identified. When the first notification priority is at or above a preconfigured level, the first artificial intelligence module can transmit a first alert notification to the cloud server indicative of the first scenario identified, and responsive thereto, the cloud server can transmit the first alert notification to the mobile device. For example, the first artificial intelligence module can identify the first scenario in which the first data indicates that multiple people are present in the first secured area in excess of a predetermined number or in which the first data indicates that a weapon is in the first secured area, identify the first notification priority associated with the first scenario as a high level, for example, the preconfigured level, and responsive thereto, transmit the first alert notification to the cloud server.

However, when the first notification priority is below the preconfigured level, the first artificial intelligence module can initiate a local action in the first secured area to resolve the first scenario identified. When the first artificial intelligence module determines that the local action fails to resolve the first scenario identified, the first artificial intelligence module can increase the first notification priority to the preconfigured level, thereby causing the first artificial intelligence module to transmit the first alert notification to the cloud server. For example, the first artificial intelligence module can identify the first scenario in which the first data indicates that a single person in the first secured area is wearing a mask or otherwise obscuring his identity, identify the first notification priority associated with the first scenario as a medium level, and initiate the local action that includes broadcasting a prerecorded local message in the first secured area instructing the single person to remove the mask or otherwise stop obscuring his identity. If the first artificial intelligence module identifies the single person complying with those instructions, then the first artificial intelligence module can identify the first scenario as being resolved. However, if the first artificial intelligence module fails to identify the single person complying with those instructions, then the first artificial intelligence module can increase the first notification priority to the high level, for example, the preconfigured level, and responsive thereto, transmit the first alert notification to the cloud server.

In some embodiments, the first artificial intelligence module can determine an identity of an individual present in the first secured area and identify the first scenario responsive to both the first data from the first surveillance device and the identity of the individual. For example, when the first artificial intelligence module identifies that the first data is indicative of the first scenario in which the weapon is identified in the first secured area, but determines the identity of the individual by recognizing a face of an authorized person, such as a security guard, the first artificial intelligence module can refrain from identifying the high level of the first notification priority associated with the first scenario. In some embodiments, the first artificial intelligence module can include an integrated face recognition processor or communicate with a separate face recognition processor.

In some embodiments, the first artificial intelligence module can include a trained artificial intelligence model saved in a database device of the first artificial intelligence module. In some embodiments, the trained artificial intelligence model can include a deep learning algorithm trained using historical data from the first surveillance device during known scenarios. In this regard, the first artificial intelligence model can analyze the historical data to identify patterns and other features of the first data from the first surveillance device that are indicative of the known scenarios, that is, the first scenario. In some embodiments, the trained artificial intelligence model disclosed herein can include recurrent neural networks and deep neural networks.

In some embodiments, the first artificial intelligence module can be located within or outside of the first secured area. Additionally or alternatively, in some embodiments, the first artificial intelligence module can be a standalone device or integrated with the first surveillance device, the cloud server, or a controller of the first surveillance device.

In some embodiments, the first alert notification can include a copy of the first data from the first surveillance device. Additionally or alternatively, in some embodiments, the first alert notification can include information or instructions for a security guard assigned to the first secured area. In some embodiments, the information or the instructions for the security guard can be dependent on a day and a time when the first alert notification is transmitted. For example, when a plurality of security guards are assigned to protect the first secured area on different days and at different times, the cloud server can insert the information or the instructions into the first alert notification for one of the plurality of security guards assigned to protect the first secured area on the day and the time that the cloud server transmits the first alert notification to the mobile device. In some embodiments, the mobile device can contact the one of the plurality of security guards using the information or the instructions in the first alert notification, and in some embodiments, the mobile device can contact the one of the plurality of security guards via the cloud server.

In some embodiments, systems and methods disclosed herein can include a second surveillance device that monitors a second secured area and transmits second data captured by the second surveillance device to a second artificial intelligence module that uses the second data to identify a second scenario associated with the second secured area and a second notification priority of the second scenario identified. When the second notification priority is at or above the preconfigured level, the second artificial intelligence module can transmit a second alert notification to the cloud server indicative of the second scenario identified, and responsive thereto, the cloud server can transmit the second alert notification to the mobile device.

FIG. 1 is a block diagram of a system 20A in accordance with disclosed embodiments. As seen in FIG. 1, the system 20A can include a first surveillance device 22, a first artificial intelligence module 24, a cloud server 26, a mobile device 28, a first local notification device 30, and a first controller 32. The first surveillance device 22, the first artificial intelligence module 24, the first local notification device 30, and the first controller 32 can be located in a first secured area SA1, and the cloud server 26 and the mobile device 28 can be remote from the first secured area SA1 and communicate with the first artificial intelligence module 24 via a network N. In some embodiments, the network N can include a wide area network, such as the Internet or a cellular network.

Figure 2:
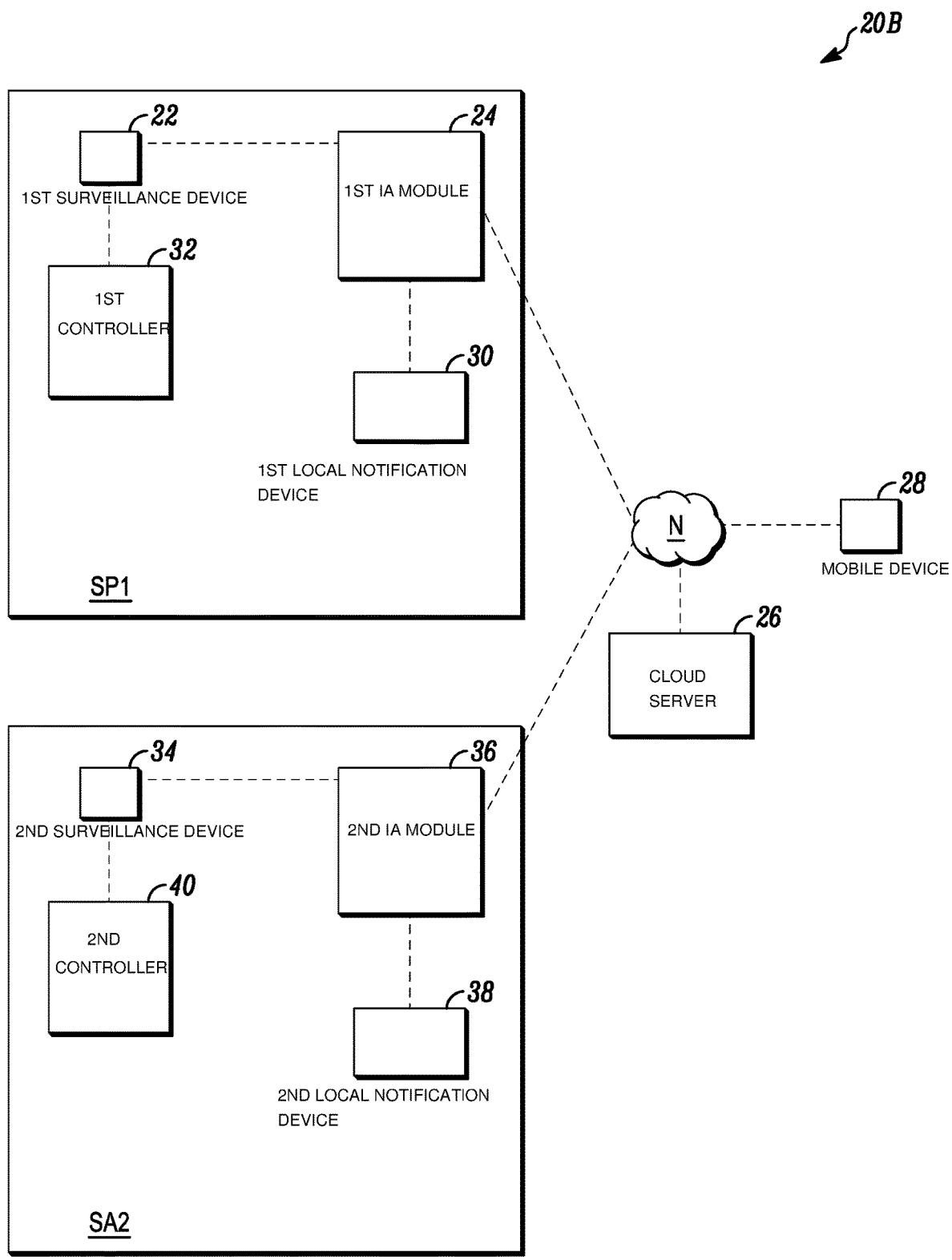
FIG. 2 is a block diagram of a system in accordance with disclosed embodiments.

FIG. 2 is a block diagram of a system 20B in accordance with disclosed embodiments. The system 20B is similar to the system 20A except that system 20B includes a second surveillance device 34, a second artificial intelligence module 36, a second local notification device 38, and a second controller 40 located in a second secured area SA2.

Figure 3:
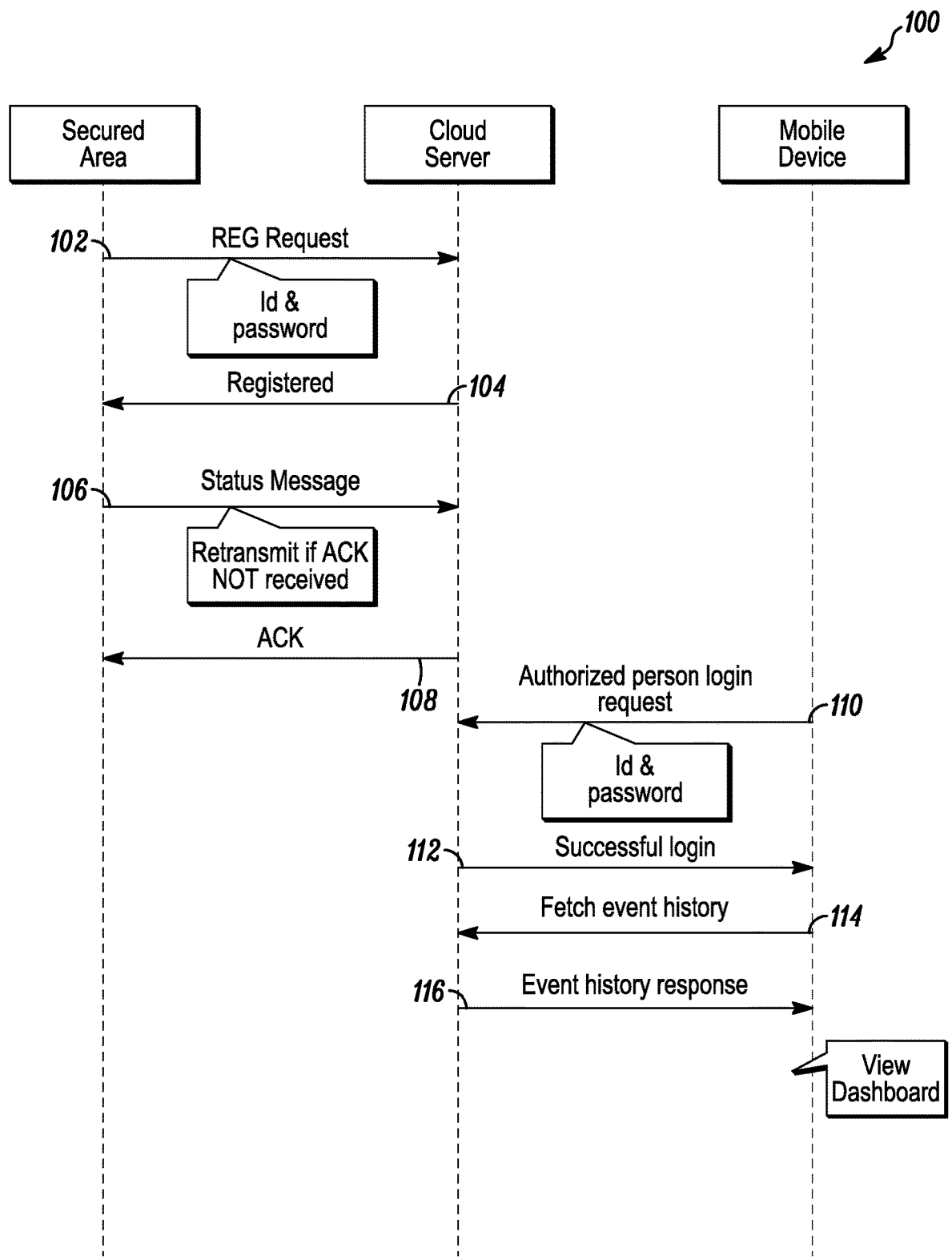
FIG. 3 is a flow diagram of a method in accordance with disclosed embodiments.

FIG. 3 is a flow diagram of a method 100 in accordance with disclosed embodiments. As seen in FIG. 3, the method 100 can include the first controller 32 or the second controller 40 sending a registration request to the cloud server 26, as in 102. In some embodiments, the registration request can include an identification number and a password for the cloud server 26. The cloud server 26 can register the first controller 32 or the second controller 40, and responsive to the registration request and a completed registration, the method 100 can include the cloud server 26 sending a registration confirmation signal to the first controller 32 or the second controller 40, as in 104. The method 100 can also include the controller 32 or the controller 40 periodically sending a status update to the cloud server 26, as in 106, and responsive thereto, the cloud server 26 transmitting an acknowledgement signal to the first controller 32 or the second controller 40, as in 108. In some embodiments, the first controller 32 or the second controller 40 can retransmit the status update to the cloud server 26 when the acknowledgement signal is not received thereby within a predetermined period of time.

As seen in FIG. 3, the method 100 can also include the mobile device 28 sending a login request to the cloud server 26, as in 110. In some embodiments, the log in request can contain the identification number and the password for the cloud server 26. Responsive to the login request, the method 100 can include the cloud server 26 sending a log in confirmation signal to the mobile device 28, as in 112. Then, the method 100 can include the mobile device 28 sending an event history request to the cloud server 26 to fetch event history for the first secured area SA1 or the second secured area SA2, as in 114, and responsive thereto, the cloud server 26 sending an event history response signal documenting the event history for the first secured area SA1 or the second secured area SA2 to the mobile device 28, as in 116. In some embodiments, a user interface device of the mobile device 28 can display the event history for the first secured area SA1 or the second secured area SA2, for example, in a dashboard-type window on the user interface device of the mobile device 28.

Figure 4:
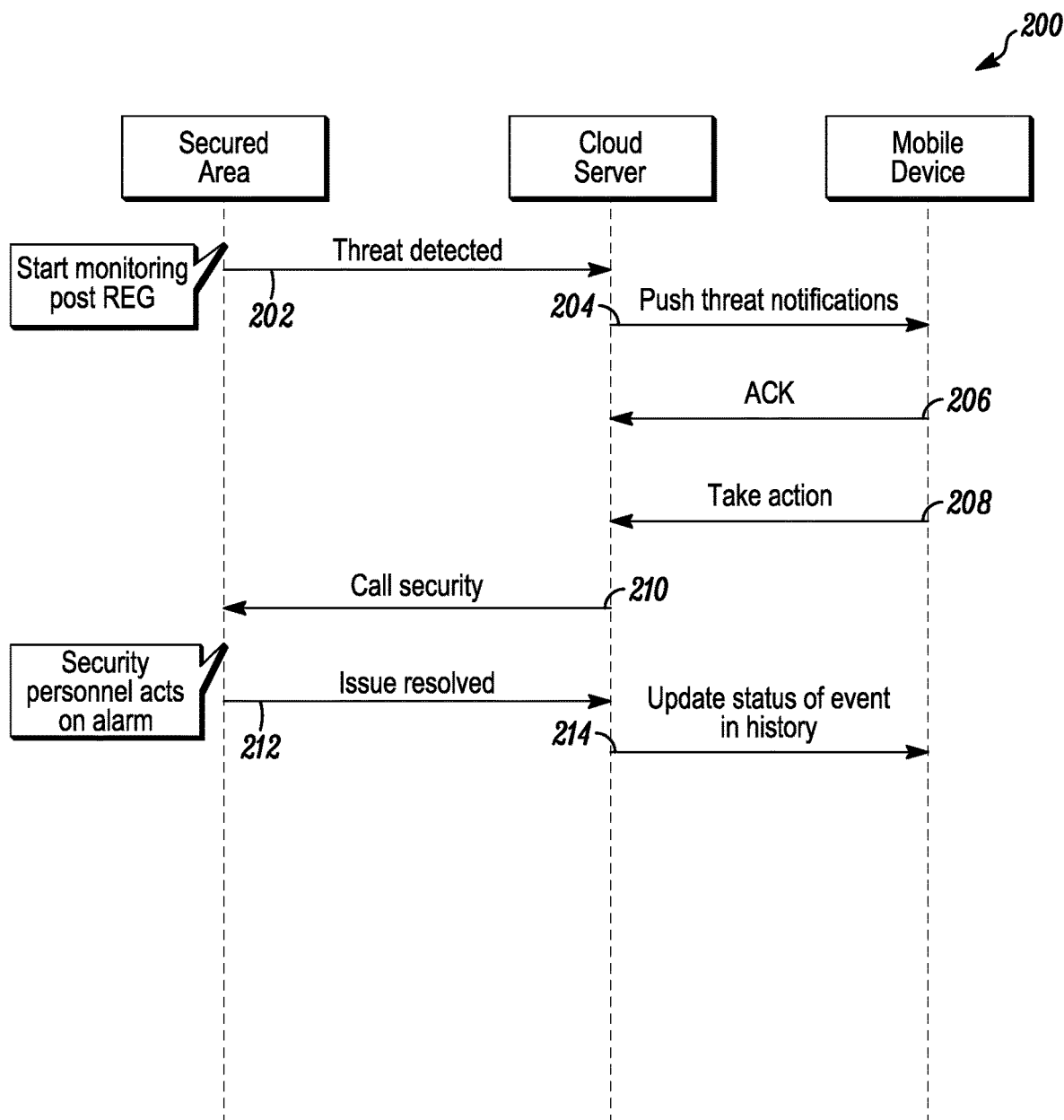
FIG. 4 is a flow diagram of a method in accordance with disclosed embodiments.

FIG. 4 is a flow diagram of a method 200 in accordance with disclosed embodiments. As seen in FIG. 4, the method 200 can include the first artificial intelligence module 24 or the second artificial intelligence module 36 identifying a scenario in the first secured area SA1 or the second secured area SA2 and associated with a notification priority having a high level and sending an alert notification indicative of the scenario to the cloud server 26, as in 202, the. cloud server 26 sending the alert notification to the mobile device 28, as in 204, and the mobile device sending an acknowledgement signal to the cloud server 26, as in 206. As seen in FIG. 4, the method 200 can also include the mobile device 28 sending an instructional signal to the cloud server 26 instructing the cloud server 26 to take action to resolve the scenario, as in 208, and the cloud server 26 initiating the action, for example, calling security or the like, as in 210. Additionally or alternatively, in some embodiments, the mobile device 28 can initiate the action without transmitting the instructional signal to the cloud server 26. Regardless of the embodiment, when first artificial intelligence module 24 or the second artificial intelligence module 36 identifies the scenario in the first secured area SA1 or the second secured area SA2 as being resolved, the method 200 can include the first artificial intelligence module 24 or the second artificial intelligence module 36 transmitting an update signal to the cloud server 26, as in 212, and responsive thereto, the cloud server sending a notification signal to the mobile device 28, as in 214.

It is to be understood that each of the first surveillance device 22, the first artificial intelligence module 24, the cloud server 26, the mobile device 28, the first local notification device 30, the first controller 32, the second surveillance device 34, the second artificial intelligence module 36, the second local notification device 38, and the second controller 40 disclosed herein can include a respective transceiver device and a respective memory device, each of which can be in communication with respective control circuitry, one or more respective programmable processors, and respective executable control software as would be understood by one of ordinary skill in the art. In some embodiments, the respective executable control software can be stored on a respective transitory or non-transitory computer readable medium, including, but not limited to local computer memory, RAM, optical storage media, magnetic storage media, flash memory, and the like, and some or all of the respective control circuitry, the respective programmable processors, and the respective control software can execute and control at least some of the methods described herein.

Although a few embodiments have been described in detail above, other modifications are possible. For example, the steps described above do not require the particular order described or sequential order to achieve desirable results. Other steps may be provided, steps may be eliminated from the described flows, and other components may be added to or removed from the described systems. Other embodiments may be within the scope of the invention.

From the foregoing, it will be observed that numerous variations and modifications may be effected without departing from the spirit and scope of the invention. It is to be understood that no limitation with respect to the specific system or method described herein is intended or should be inferred. It is, of course, intended to cover all such modifications as fall within the spirit and scope of the invention.

What is claimed is:

1. A system comprising:
   a transceiver device that receives first data from a first surveillance device that monitors a first secured area;
   a processor that uses the first data to identify a first scenario associated with the first secured area and a first alert notification having a first notification priority of the first scenario; wherein:
   when the processor recognizes a presence of a weapon carried by a person in the first secured area using the first data in the first scenario, and also recognizes the person as being authorized to carry the weapon, the processor sets the first notification priority below a preconfigured level;
   when the processor recognizes a presence of a weapon carried by a person in the first secured area using the first data in the first scenario, but does not recognizes the person as being authorized to carry the weapon, the processor sets the first notification priority at or above the preconfigured level;
   when the first notification priority is below the preconfigured level, the processor does not transmit, via the transceiver device, the first alert notification with the first notification priority to a cloud server indicative of the first scenario; and
   when the first notification priority is at or above the preconfigured level, the processor transmits, via the transceiver device, the first alert notification with the first notification priority to a cloud server indicative of the first scenario.

2. The system of claim 1 wherein the first alert notification includes a copy of the first data.

3. The system of claim 1 wherein the first alert notification includes contact information for a security guard assigned to the first secured area.

4. The system of claim 1 wherein the first data includes audio data or video data captured from the first secured area.

5. The system of claim 1 wherein the processor is integrated with the first surveillance device.

6. The system of claim 1 wherein the processor is integrated with a controller of the first surveillance device.

7. The system of claim 1 wherein the transceiver device receives second data from a second secured area, and wherein the processor uses the second data to identify a second scenario associated with the second secured area and a second alert notification having a second notification priority of the second scenario, and transmits, via the transceiver, the second alert notification indicative of the second scenario when the second notification priority is at or above the preconfigured level.

* * * * *